United States Patent [19]
Karasawa

[11] Patent Number: 4,928,046
[45] Date of Patent: May 22, 1990

[54] MULTIPLE ROTATIONAL POSITION SENSOR

[75] Inventor: Yutaka Karasawa, Iida, Japan

[73] Assignee: Tamagawa Seiki Kabushiki Kaisha, Tokyo, Japan

[21] Appl. No.: 340,856

[22] Filed: Apr. 20, 1989

[30] Foreign Application Priority Data

Dec. 29, 1988 [JP] Japan ................... 63-330926

[51] Int. Cl.⁵ ............................ H02K 39/00
[52] U.S. Cl. .................... 318/654; 318/138; 318/254; 318/439; 310/160; 310/171; 310/111
[58] Field of Search ............ 318/650–661, 318/138, 254, 439, 692; 310/68 R, 111, 134–136, 141, 142, 155, 160, 163, 169, 168, 171, 179, 184, 180, 216, 218, 254, DIG. 3; 340/870.34, 870.31

[56] References Cited

U.S. PATENT DOCUMENTS

| | | | |
|---|---|---|---|
| 2,889,475 | 6/1959 | Emerson | 310/171 |
| 3,141,101 | 7/1964 | Ketay | 310/171 X |
| 3,177,387 | 4/1965 | Leischner | 310/160 |
| 3,197,660 | 7/1965 | Leischner | 310/160 |
| 3,530,345 | 9/1970 | Ibrahim et al. | 318/654 |
| 4,659,953 | 4/1987 | Luneau | 310/111 |
| 4,733,116 | 3/1988 | Schulz | 310/171 X |

Primary Examiner—Vit W. Miska
Assistant Examiner—Paul Ip
Attorney, Agent, or Firm—Brooks Haidt Haffner & Delahunty

[57] ABSTRACT

A multiple rotational position sensor includes a stator winding provided to a stator mounted to a casing and a rotor having a rotor winding provided to a rotor shaft mounted for rotation to the casing, in which the rotational position is sensed by the relative rotation between the rotor and the stator. According to the present invention, the sensor also includes a speed reducing unit for coupling the rotor shaft and the casing together and outer bearings for rotatably carrying the casing, which is revolved by rotation of the rotor shaft by an angle less than the angle of rotation of the rotor shaft.

3 Claims, 5 Drawing Sheets

MULTIPLE ROTATIONAL POSITION SENSOR

BACKGROUND OF THE INVENTION

1. Field of the Invention

This invention relates to a multiple rotational position sensor. More particularly, it relates to a novel improvement therein which consists in that a casing having a stator is rotationally interlocked with a rotor shaft of a casing having a stator for sensing the absolute value of the many number of rotations of the rotor shaft.

2. Prior Art

While a variety of rotational position sensors of the above type, such as resolver or synchro is employed, the construction of a resolver produced by the present Applicant is shown herein in FIG. 1, as typical of these sensors.

Referring to FIG. 1, the numeral 1 denotes a generally tubular casing, and a rotor shaft 4 is carried for rotation by a pair of bearings 2 and 3 provided on either ends of the casing 1.

On the rotor shaft 4, a rotor 5 for a rotary transformer having a rotor winding 5a for a rotational transformer and a rotor 6 for a resolver having a rotor winding 6a for a resolver are mounted with a predetermined spacing in-between as set by a spacer 7.

On the inner wall 1a of the casing 1 in register with the rotor 5 for the rotary transformer, there is provided a stator 8 having a stator winding 8a for the rotary transformer, with the stator winding 8a for the rotary transformer being inductively coupled with the stator winding 8a for the rotational transformer.

On the inner wall 1a of the casing 1, in register with the rotor 6 for the resolver, there is provided a stator 9 having a stator winding 9a for the resolver. The stator 8 for the rotational transformer and the stator 9 for the resolver are maintained at a predetermined distance from each other by a spacer 10. The rotor 6 for the resolver and the stator 9 for the resolver make up a resolver section 11.

The above described resolver operates in the following manner.

When an exciting signal is supplied from the stator winding 8a of the rotational transformer, this exciting signal is supplied from the rotor winding 5a for the rotational transformer to the rotor winding 6a for the resolver for exciting the rotor winding 6a for the resolver.

When the rotor shaft 4 is revolved as it is coupled to a rotational member of a machine tool, not shown, there is obtained a rotational angle signal proportionate to the rotational angle of this rotor shaft 4.

The above described resolver of the prior art suffers from the following disadvantages. That is, when the state of rotation over a plural number of times of revolutions of a rotor shaft is to be detected, the resolver need be connected by way of a speed reducing unit to a separate resolver with resulting increase in the overall size of the system and manufacture costs so that the recent demand for reduced size and costs cannot be met.

SUMMARY OF THE INVENTION

It is therefore an object of the present invention to provide a multiple position sensor in which a casing having a stator is rotationally interlocked with a rotor shaft for sensing the absolute value of the multiple number of revolution of the rotor shaft.

In accordance with the present invention, there is provided a multiple rotational position sensor comprising a stator winding provided to a stator mounted to a casing, and a rotor having a rotor winding provided to a rotor shaft mounted for rotation to said casing, in which the rotational position is sensed by the relative rotation between the rotor and the stator, wherein the multiple rotational position sensor comprises further a speed reducing unit adapted for coupling the rotor shaft and the casing together, and outer bearings for rotatably carrying said casing, said casing being revolved by rotation of said rotor shaft and said casing being revolved by an angle lesser than the angle of rotation of said rotor shaft.

According to the present invention, there is also provided a multiple rotational position sensor comprising a stator provided for rotation to a casing and having a stator winding, a rotor provided for rotation in said casing and having a rotor winding in correspondence with said stator, a rotor shaft carrying said rotor and mounted for rotation to said casing and a speed reducing unit for transmitting rotation of said rotor shaft to said stator at a desired ratio of rotation, wherein the stator is adapted to rotate for not more than a complete revolution when the rotor shaft performs a full revolution.

According to the multiple rotational position of the present invention, the stator is rotationally interlocked via a speed reducing unit of a desired ratio of rotation with a rotor revolved concurrently with the rotor shaft, so that, when the speed reducing unit is desired with a ratio of rotation of N, the stator performs a $360° \times (1-N)$ rotation for one complete revolution of the rotor shaft. Thus, with N equal to 0.75, the output rotational angle signal is a 90° signal for each revolution of the rotor shaft, so that the 360° output signal is produced for four revolutions of the rotor shaft and hence it becomes possible to sense the four revolutions of the rotor shaft. In addition, since the rotor and the stator perform a relative rotation with respect to each other and the multiple rotational states of the rotor shaft may be sensed, the sole sensor suffices, with corresponding reduction in the overall size of the device and the manufacture costs.

BRIEF DESCRIPTION OF THE DRAWINGS

FIGS. 2 to 11 illustrate a multiple rotational position sensor according to the present invention, wherein FIG. 2 is a sectional view of the overall device.

FIG. 3 is a sectional view showing a modification of FIG. 2.

FIGS. 4 and 7 are sectional views showing another modification of FIG. 2.

FIGS. 5 and 6 are wiring diagrams for the winding.

FIG. 8 is a waveform diagram.

FIG. 9 is an electrical wiring diagram for each winding.

FIG. 10 is a vector diagram showing the input and output voltages.

FIG. 11 is a sectional view showing still another modification of FIG. 2.

DESCRIPTION OF PREFERRED EMBODIMENT

Figure 1:
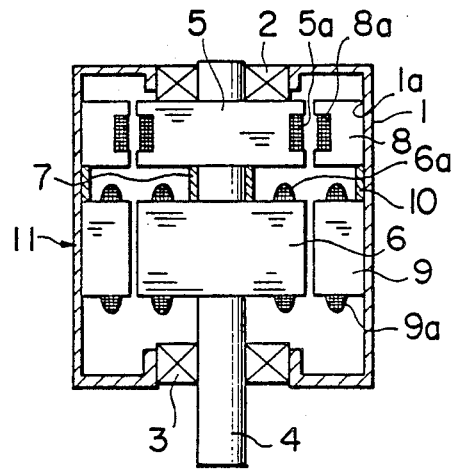
FIG. 1 is a sectional view showing a prior-art arrangement for the multiple rotational position sensor.

By referring to the drawings, certain illustrative embodiments of the present invention will be explained hereinbelow in detail.

The parts or components similar to those of the prior-art device are depicted by the same reference numerals.

Figure 2:
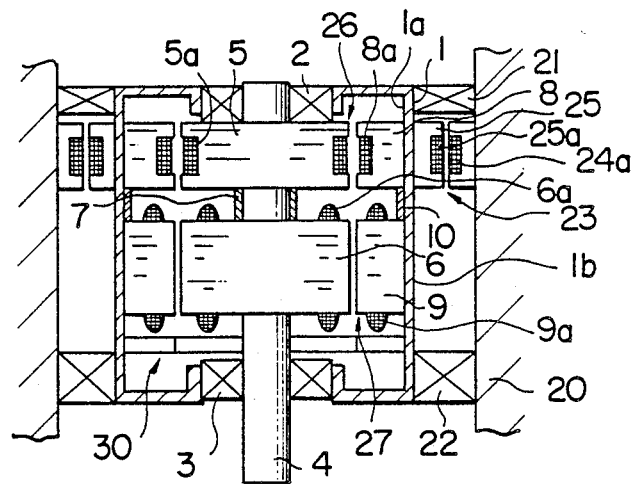
Figure 3:
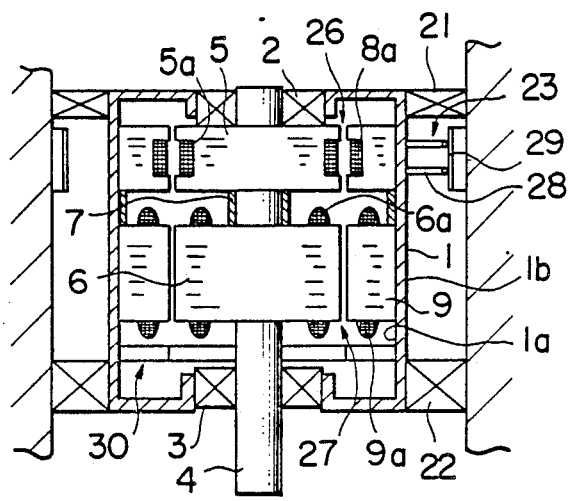
Figure 4:
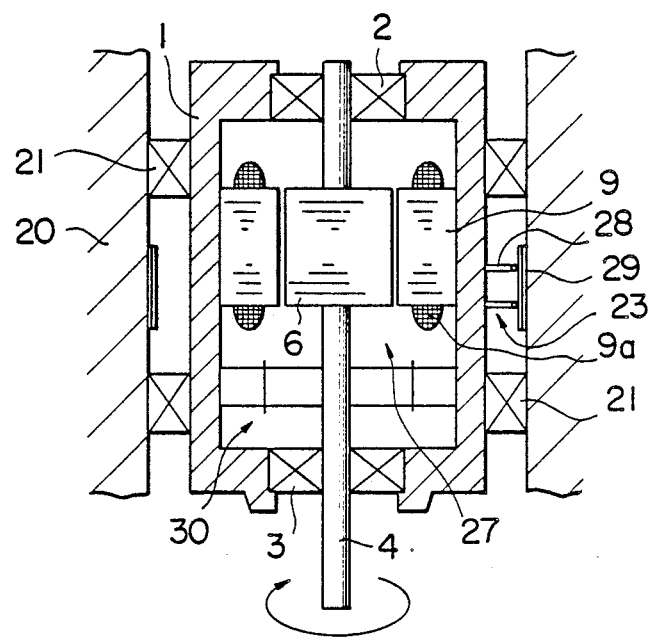
Figure 5:
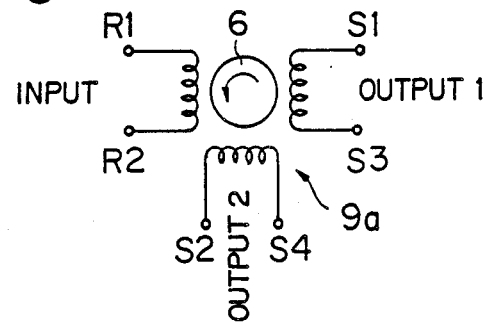
Figure 6:
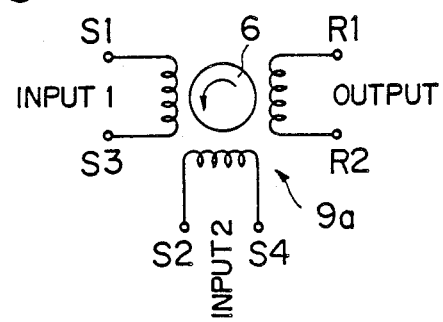
Figure 7:
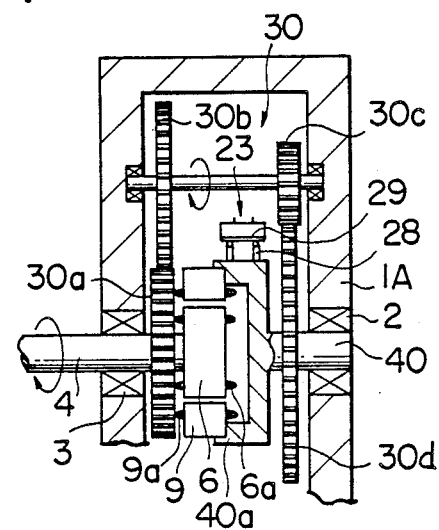
Figure 8:
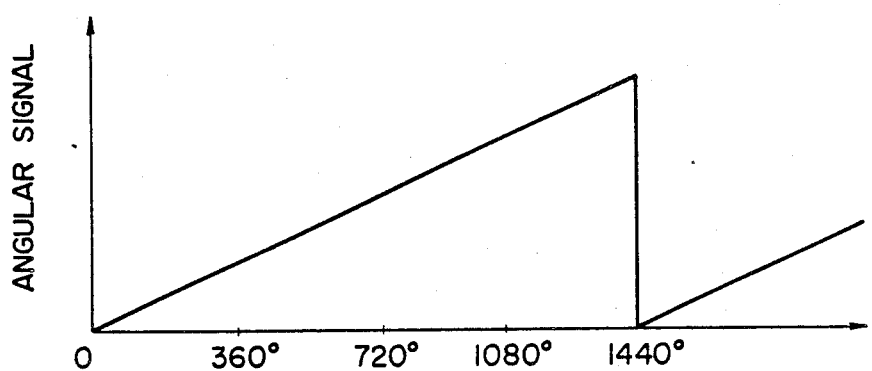
Figure 9:
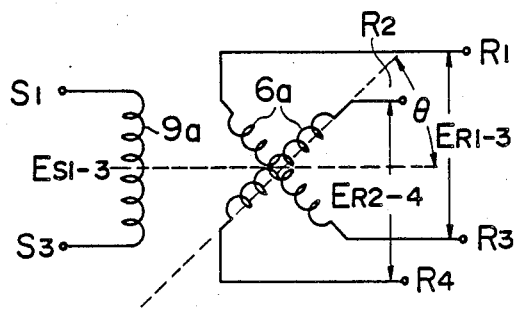
Figure 10:
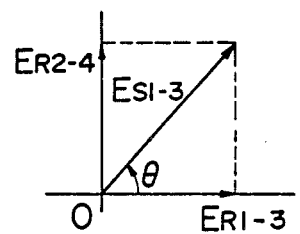
Figure 11:
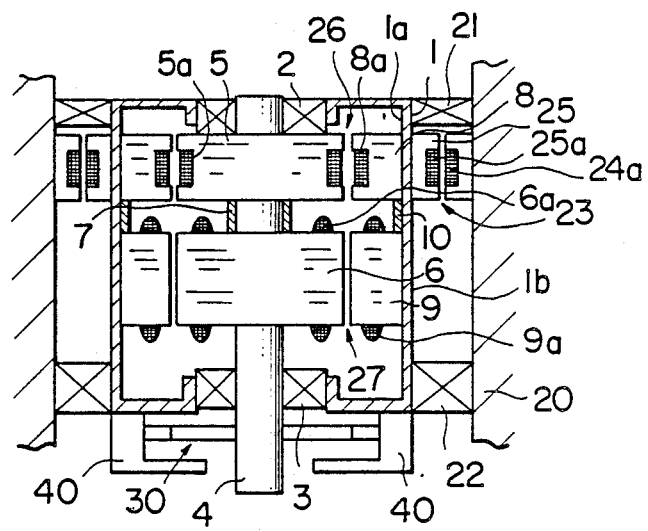

FIGS. 2 through 11 illustrate the multi-position sensor according to the present invention, wherein FIG. 2 is a sectional view showing the overall device, FIG. 3 is a sectional view showing a modification of FIG. 2, FIGS. 4 and 7 are sectional views illustrating a modification of FIG. 2, FIG. 9 is an electrical wiring diagram for each wiring, FIG. 10 is a vector diagram showing input and output voltages and FIG. 11 is a sectional view showing a modification of FIG. 2.

Referring to FIG. 2, the numeral 1 denotes a generally tubular casing, the outer peripheral surface 1b being carried for rotation by a pair of outer bearings 21, 22 provided to a base 20, and being provided with means 23 consisting of a non-contact type rotational transformer for taking out exterior signals.

The means 23 is comprised of a stator 24 for an exterior rotational transformer provided to the base 20 and including a stator winding 24a for a rotational transformer and a rotor 25 for an exterior rotational transformer provided to the outer peripheral surface 1b of the casing and including a rotor winding 25a for the exterior rotational transformer.

On the inner wall 1a of the casing 1 and in register with the signal take-out means 23, there is provided a stator 8 for the rotational transformer having a stator winding 8a for the rotational transformer. At the lower portion of the inner wall 1a, there is provided a stator 9 having a stator winding 9a with the intermediary of a spacer 10.

A rotor shaft 4 is mounted for rotation on a pair of bearings 2 and 3 provided on both ends of the casing 1. On this rotor shaft 4, a rotor 5 for a rotational transformer having a winding 5a for the rotational transformer and a rotor 6 having a rotor winding 6a are provided with the intermediary of a spacer 7. The rotor 5 for the rotational transformer and the stator 8 for the rotational transformer make up a rotational transformer 26, while the rotor 6 and the stator 9 make up a resolver or a synchro acting as a rotational position sensor 27.

A speed reducing unit 30 composed of gears having a desired speed reducing ratio is provided between the rotor shaft 4 and the casing 1, with the casing 1 performing a rotation over an extent of not more than 360° for each complete revolution of the rotor shaft 4.

The arrangement shown in FIG. 3 is similar to that shown in FIG. 2 with the exception that the signal take-out means 23 is not constituted as a rotational transformer but by a brush 28 and an electrically conductive ring 29. Since the arrangement of FIG. 3 is otherwise the same as that shown in FIG. 2, the same parts or components in these figures are indicated by the same reference numerals and the corresponding description is omitted for avoiding the redundancy.

The arrangement of a modified embodiment shown in FIG. 4 is also similar to that of FIG. 2 or 3. However, in the arrangement shown in FIG. 2 or 3, exciting signals are supplied through the rotational transformer 26 to the rotor winding 6a, whereas the arrangement of the present modification is formed as a well-known variable reluctance type resolver or synchro wherein exciting signals are supplied to the stator winding 9a and output signals are taken out from this stator winding 9a. This stator winding may be formed as the one input two output type winding, as shown in FIG. 5, or as the two input one output type winding, as shown in FIG. 6.

In the arrangement of FIG. 4, the same parts or components that are the same as those of FIGS. 2 and 3 are indicated by the same reference numerals and the corresponding description thereof is omitted for avoiding the redundancy.

FIG. 7 shows the arrangement of another modification of the present invention, which differs from the preceding embodiments in that the casing structure is modified such that a casing 1A is stationary and a stator 9 is provided on a retaining portion 40a of a shaft 40 for rotation with the shaft 40. The rotation of the rotor shaft 4 is transmitted to a driving gear 30d of the shaft 40 by the intermediary of gears 30a, 30b, 30c connected to the rotor shaft 4 and making up a speed reducing unit 30.

In the arrangement shown in FIG. 7, the parts or components that are the same as those shown in FIGS. 2 and 3 are indicated by the same reference numerals and the corresponding description is omitted for avoiding the redundancy.

The above described multiple rotational position sensor according to the present invention operates in the following manner.

In general, in case of a rotational position sensor consisting in a resolver or a synchro, as shown in FIGS. 9 and 10, the stator winding 9a and the rotor winding 6a of the resolver are each formed by two windings with a shift of an electrical angle of 90° from each other. In the wiring configuration of FIG. 9, the stator winding 9a has a single-phase winding, whereas the rotor winding 6a has an orthogonal two-phase winding.

When a predetermined A.C.-voltage is applied across the terminals $S_1$-$S_3$ of the stator winding 9a, a voltage is produced in the rotor winding 6a by interlinkage of magnetic fluxes as a result of electro-magnetic induction. The magnitude of the output voltage depends on the degree of magnetic coupling between the stator winding 9a and the rotor winding 6a which depends in turn on the angle of the rotor 6 and the amplitude of the voltage applied to the stator winding 9a, with the amount of the magnetic fluxes interlinked with each of the rotor windings 6a being proportionate to the sine and the cosine of the angle of the rotor 6.

Thus, when the angle $\theta$ of the rotor 6 is fixed, with the input of the stator 9, the output of the rotor 6 and the maximum coupling coefficient being given as $E_{S1\text{-}3}$, $E_{R1\text{-}3}$ and $E_{R2\text{-}4}$, and K, respectively, the output voltage is given by the following equations:

$$E_{R1\text{-}3} = KE_{S1\text{-}3} \cos \theta, \text{ and}$$

$$E_{R2\text{-}4} = KE_{S1\text{-}3} \sin \theta.$$

FIG. 10 shows the electrical relation in a vector form with the aid of the above equations. It is seen from this figure that the excitation voltage of the resolver has been translated into two orthogonal voltages.

Hence, in the above described arrangements shown in FIGS. 2 and 3, the exciting signals introduced via rotational signal take-out means 23 are supplied via rotational transformer 26 to the rotor winding 6a, while the rotational position signals may be taken out at the signal take-out means 23 from the stator winding 9a via jumper wire, not shown.

In the arrangement shown in FIG. 4 or 7, the stator winding 9a is a dual winding of both the input and the output, output signals can be supplied at the stator winding 9a upon exciting the winding 9a.

The operation of relative rotation between the rotor 6 and the stator 9 in the above arrangements is hereinafter explained.

With the ration N of the r.p.m. of the rotor shaft 4 and that of the speed reducing unit 30 for transmitting the rotation of the stator 9, the stator 9 makes a rotation of 360°×(1-N) for one complete revolution over 360° of the rotor shaft 4. With the ratio N of 0.75, the signal of 90° is obtained for each revolution of the rotor shaft 4. The output signal of 360° is obtained for four revolutions of the rotor shaft 4, so that four revolutions may be detected, as shown in FIG. 8.

Thus, by setting the ratio N to a desired value, it becomes possible to obtain an absolute rotational signal for the rotor shaft 4.

Similar results may be obtained when the speed reducing unit 30 is provided to an exterior mounting member provided outside of the casing 1, as shown in FIG. 11.

It is noted that an absolute rotational signal of a still higher order may be obtained when the arrangement of FIG. 2 is used as the primary stage, a rotor is provided outside of the first stage, a stator is provided outside of the rotor and a speed reducing unit is provided between the stator and the rotor of the second stage. The same performance may be obtained with the arrangement in which the second stage rotor is provided ahead or back of the first stage and coupled to the casing of the first stage with the same arrangement as that of the first stage.

What is claimed is:

1. A multiple rotational position sensor comprising a stator winding provided to a stator mounted to a casing, and a rotor having a rotor winding provided to a rotor shaft mounted for rotation to said casing, in which the rotational position is sensed by the relative rotation between the rotor and the stator, wherein the improvement resides in that the multiple rotational position sensor comprises further a speed reducing unit adapted for coupling the rotor shaft and the casing together, and outer bearings for rotatably carrying said casing, said casing being revolved by rotation of said rotor shaft and said casing being revolved by an angle less than the angle of rotation of said rotor shaft.

2. The sensor according to claim 1 wherein said speed reducing unit is adapted to be held by an exterior mounting member provided outside of said casing.

3. The sensor according to claim 1 further comprising rotational signal take-out means provided outside of said casing, signals being entered to or outputted from said stator winding or rotor winding by said signal take-out means.

* * * * *